C. Monson,
Pipe Coupling,
Nº 19,150. Patented Jan. 19, 1858.
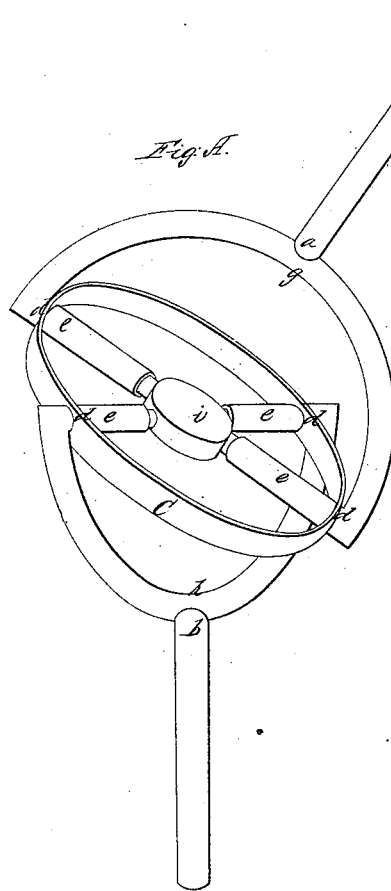
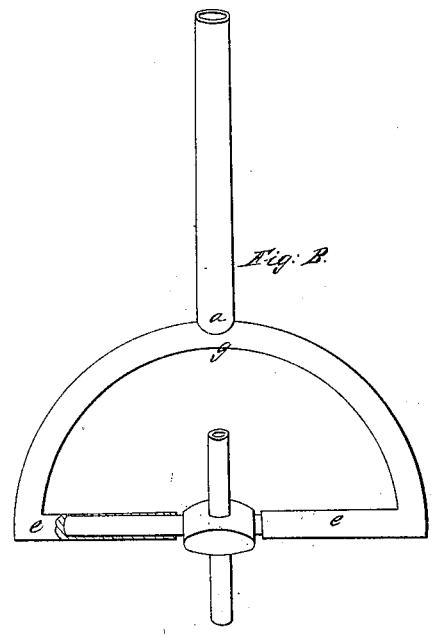
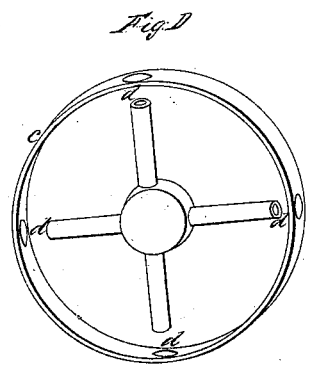

UNITED STATES PATENT OFFICE.

CHARLES MONSON, OF NEW HAVEN, CONNECTICUT.

GAS-TUBE JOINT.

Specification forming part of Letters Patent No. 19,150, dated January 19, 1858; Reissued May 9, 1858, No. 536.

*To all whom it may concern:*

Be it known that I, CHARLES MONSON, of the city and county of New Haven, State of Connecticut, United States of America, have invented a new and useful Improvement which I denominate a "Universal Tube-Joint," useful for varying and turning with facility and to any direction the current of a fluid through a tube; and I hereby declare that the following is a full, clear, and exact description of the construction and operation of the same, reference being had to the annexed drawings as a part of this description.

In shop windows, work shops, private studies, and other places, a pendant light is often desirable, and it is also requisite that it should be movable in order that the light may be thrown in a particular direction upon books, maps, drawings, or any article or piece of work, as the emergency may require. Even in the sitting room or nursery, a pendant light which may be swung toward or from the fire at will is far more convenient than the flexible rubber tubes now employed, which soon become saturated with gas and constantly emit an offensive odor, injurious to health. These rubber tubes are also very objectionable where there are children, on account of the liability of such tubes to be thrown down, thus occasioning serious accidents.

The tube joints now in use for gas fixtures allow motion only in a given direction, and such tubes are very liable to injury from any slight knock. To remedy this defect in metallic tubes, it is necessary to employ a universal joint, which will not wear by use; and at the same time it is desirable that such joint be ornamental instead of being inelegant.

Although a rude flexible joint in a metallic tube is not new, I am not aware that any attempt has been made to improve gas fixtures by a beautiful and durable joint, such as I have invented.

My invention consists of a metallic tube joint, with a relief-ring to prevent wearing the joint, for the purpose of rendering pendant lights movable.

In the accompanying drawings, Figure A represents a portion of a gas pendant, with my joint inserted. Figs. B, C, and D represent the separate parts.

The upper gas tube $a$, is firmly connected with a semicircular tube $g$, which terminates in two tubular arms, $e$, $e$. In like manner the lower gas tube $b$, is connected with a semicircular tube $h$, which terminates in two tubular arms, $e$, $e$. Into these four arms, $e$, are inserted four tubes, $m$, as is best shown in Fig. B, where a portion of one of the tubes $e$ is broken away to show the mode of insertion and the structure of the joint. All these tubes $m$, revolve freely in the tubes $e$, while they are firmly inserted into the central chamber $i$. Upon the arms $e$, $e$, is adjusted a bearing or relief ring $c$, in such manner that the arms $e$, $e$, may rotate in the bearings $d$, of the ring. This ring prevents any strain or wear from coming upon the tube joints, and at the same time gives a finish to the whole arrangement. It is evident that we thus have a universal tube joint.

By means of this joint a gas pendant is rendered somewhat movable and made to swing gracefully, presenting an elegant appearance compared to the stiff pendants now in use. If by accident a person's head touches a pendant having my joint, no harm is done to either head or pendant.

My invention is designed chiefly for gas fixtures but it may be used for other similar purposes.

It is not essential that all parts should be tubular, provided only that the gas has a free passage from $a$, to $b$.

Having thus fully described my invention, what I claim and desire to secure by Letters Patent of the United States is:

The arrangement of the semicircular tubes $g$, $h$, in connection with the ring C, and central chamber $i$, constructed and operated substantially as set forth.

CHAS. MONSON.

Witnesses:
A. S. MONSON,
A. H. DERBY.

[FIRST PRINTED 1911.]